United States Patent

[11] 3,588,609

[72] Inventor Harry Joseph Keen
 Middletown, N.J.
[21] Appl. No. 750,982
[22] Filed Aug. 7, 1968
[45] Patented June 28, 1971
[73] Assignee Buck Engineering Co., Inc.
 Freehold, N.J.

[54] PROTECTOR CIRCUIT FOR ELECTRICAL MEASURING SYSTEM
 8 Claims, 1 Drawing Fig.
[52] U.S. Cl. .................................................. 317/31,
 317/40, 324/110
[51] Int. Cl. .................................................. H02h 3/20,
 G01r 1/36
[50] Field of Search .......................................... 324/62 (R),
 110; 317/31, 37, 40

[56] References Cited
UNITED STATES PATENTS
3,426,274 2/1969 Wise .......................... 324/110
2,671,874 3/1954 Friedrichs .................. 324/110
FOREIGN PATENTS
695,816 8/1953 Great Britain ............... 317/40

Primary Examiner—Robert K. Schaefer
Assistant Examiner—William J. Smith
Attorney—John W. Hoag ABSTRACT: A temperature sensitive switch means is provided in series circuit path between an input terminal and means of a resistance measuring apparatus for disconnecting the resistance means from said input terminal upon the connection thereto of an excessive voltage source.

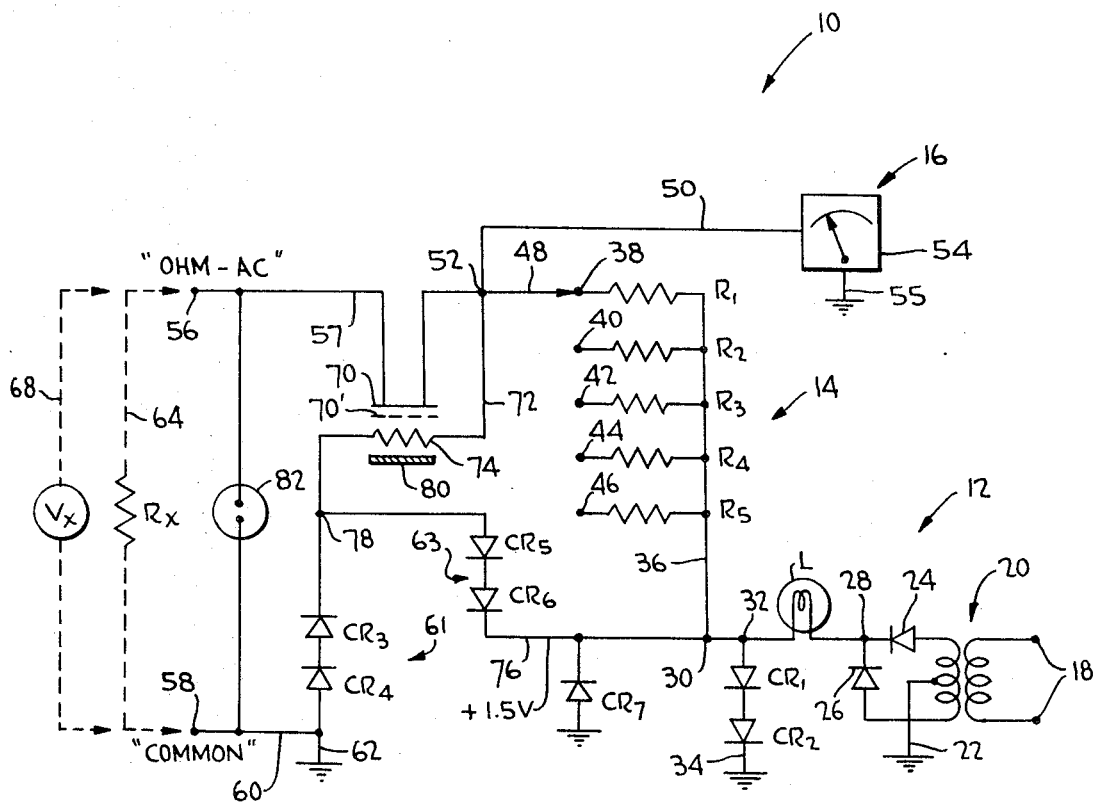

PROTECTOR CIRCUIT FOR ELECTRICAL MEASURING SYSTEM

This invention relates to a protector circuit for a test instrument, and more particularly to a protector circuit which operates to disconnect a resistance measuring circuit upon the erroneous application of a voltage source to the input terminals of a test instrument, which terminals are adapted for normally receiving a circuit of unknown resistance to be measured by the resistance measuring circuit.

The standard resistance measuring apparatus is provided with a plurality of input terminals which usually take the form of input jacks for normally receiving in connection therewith an external circuit having an unknown resistance to be measured. If, however, a voltage source is erroneously connected to the input terminals, considerable damage to the resistance measuring circuit may occur. To guard against said damage it has been the practice in the design of various types of resistance measuring apparatus to include a protective circuit in the form of a circuit breaker or fusing device in a series path between the apparatus input terminals and the resistance measuring circuit. The fusing device is selected to present a negligible resistance relative to the measuring circuit series resistance and have a given current sensitivity commensurate with the requirements of the circuit to be protected. However, when the resistance measuring apparatus is operable over several resistance ranges and includes a plurality of different valued resistors switchable separately or in combination into a series circuit path with the apparatus input terminals, heretofore known fusing arrangements have not proved satisfactory since the fusing requirements of the apparatus will vary both in current sensitivity and maximum value tolerable, depending upon the magnitude of the switched resistance in the circuit path. For example, when operating on a range adapted for the measurement of relatively low resistances, a negligible fuse resistance may be in the order of a 10th of an ohm with suitable protection by a 10 ampere current rating. On the other hand, a high resistance range may require a fuse having a current sensitivity of 10 milliamperes. The series resistance of the fuse would probably be in the order of 100 ohms.

It is therefore an object of the present invention to provide an improved protector circuit for a multirange resistance measuring apparatus.

A further object of the present invention is to provide a protector circuit which operates to disconnect a resistance measuring circuit from its input terminals upon the connection of an excessive voltage source thereto.

A still further object of the present invention is to provide in a measuring apparatus a protector circuit which is substantially voltage sensitive and presents a negligible series resistance to the resistance measuring circuit.

In accordance with the present invention, a protector circuit is provided which includes a temperature sensitive switching device, normally closed, and connected in a direct current circuit path with a resistance measuring circuit and the input terminals thereto. Heating means coupled to said switching device are responsive to the presence of an external voltage applied to said input terminals for heating said switch to a predetermined temperature to open said circuit path.

The novel features which are considered to be characteristic of the invention are set forth with particularity in the appended claims. The invention itself, however, both as to its organization and method of operation as well as additional objects and advantages thereof, will best be understood from the following description when read in connection with the accompanying drawing in which:

The FIGURE is a schematic representation of a resistance measuring apparatus provided with a protector circuit according to the invention.

With more particular reference to the drawing, there is shown generally at 10 a schematic representation of a resistance measuring apparatus including circuit means 12 adapted to provide a source of operating potential, a graduated resistor bank, indicated generally at 14, and a resistance indicating or display circuit, indicated generally at 16. The circuit means 12 includes a voltage stepdown transformer 20 having a primary winding connected to a pair of input terminals 18 adapted to be coupled to an alternating current (AC) source, not shown, for energizing said circuit means. A pair of diodes 24 and 26 are connected between the transformer secondary winding and a junction 28, with the secondary winding center tapped to ground at 22, so as to provide, in a well-known manner, a rectified output DC current. Although one form of supplying an output DC current has been described, it should be understood that any other controlled source of DC current, such as a dry cell, storage battery or the like, may be substituted therefore without altering the scope of the present invention. Upon further reference to the FIG., the output DC current is supplied to a lamp L and to a junction 30.

Electrically connected at a junction 32, between the lamp L and the junction 30, are a pair of diodes CR1 and CR2 forward biased to ground 34 relative to the output DC current so as to provide a conductive path thereto, with the voltage developed across said diodes providing a regulated output voltage of approximately 1.5 volts DC at the junction 30. The lamp L is purposely selected with constant current characteristics, which characteristics are complementary to the forward conducting characteristics of the diodes CR1 and CR2 to provide a further regulated source of DC current to the junction 30. The graduated resistor bank 14 comprises, for example, the resistors R1, R2, R3, R4 and R5 having a common connection along a conductor 36, which connects the resistor bank 14 to the junction 30 in series relationship with the circuit operating potential voltage developed across the diodes CR1 and CR2. The resistors R1—R5 may have the following graduated values:

R1=10 ohms
R2=100 ohms
R3=1 K ohms
R4=10 K ohms
R5=100 K ohms

The resistors R1—R5 of the resistor bank 14 are provided with terminals 38, 40, 42, 44 and 46, respectively. A manually adjustable selector switch, indicated schematically at 48, may be selectively connected by an operator of the resistance measuring apparatus 10 to any one of the terminals 38, 40, 42, 44, or 46. The switch 48 may take the form of a control knob, not shown, mounted externally of a housing, not shown, for containing the resistance measuring apparatus 10. The resistance indicating circuit 16 is connected via a conductor 50 to a junction 52, which may be a fixed terminal of the selector switch 48. The indicating circuit 16 may include a visual indicating meter as shown schematically at 54, which meter is advantageously mounted externally of a housing, not shown, for containing the resistance measuring apparatus 10. In addition, the indicating circuit includes electrical components, not shown, for driving the meter, and a connection to ground potential at 55.

A first input terminal 56 is connected via a conductor 57 to the junction 52, and a second input terminal 58 is connected via a conductor 60 to ground potential as indicated at 62. The first input terminal 56 and the second input terminal 58 may advantageously take the form of input jacks that are mounted in a housing, not shown, for the apparatus 10, and may be captioned Ohm AC and Common, respectively, as indicated in the accompanying FIG.

The circuit of the apparatus thus far described is conventional, and in the operation thereof, a circuit of unknown resistance to be measured is connected to the input terminals 56 and 58 and its resistance value is registered for visual inspection on the meter 54. Such a circuit is shown schematically at 64 in phantom and its unknown resistance is designated by the symbol $R_x$. If, however, a voltage source, such as the source $V_x$ shown schematically in phantom at 68, is erroneously connected to the input terminals 56 and 58, a current will flow, for example, if the voltage is positive, from the voltage source $V_x$ through the junction 56, along the conductor 57, through the junction 52, along the conductor 48 and through a selected resistor in the resistor bank 14 and the diodes CR1 and CR2 to ground potential. The passage of such current through the selected resistor may cause severe damage thereto, consequently rendering the apparatus 10 inoperative. Accordingly, a protective circuit is provided according to the invention to prevent the passage of such current when a voltage source, such as the voltage source $V_x$ is erroneously connected to the input terminals 56 and 58.

A preferred embodiment of the protective circuit is included in the FIG. and includes a thermostat, shown schematically at 70, in series connection between the input terminal 56 and the measuring circuits resistance bank and operating potential source. The thermostat 70 is of the automatically resetting type and includes a free disc bimetallic sensing element. With the disc in its closed position, the thermostat 70 provides a contiguous electrical connection between the input terminal 56 and the junction 52 and therefore a selected resistor in the resistance bank 14 and the indicating circuit 16 connected thereto. With the sensing disc in its open position, as indicated schematically in phantom at 70', the selected resistor and indicating circuit are electrically disconnected from the input terminal 56. A conductor 72 is provided with a heating element 74, which may take the form of a resistor in close thermal proximity to the disc sensing element of the thermostat, and comprised of a nickel-chromium wire that will withstand hot operating temperatures of the order of 2,000° F. The heating element 74 is connected to ground potential at 62 through a first diode bank, generally shown at 61 and comprising, for example, a pair of diodes CR3 and CR4 which are series connected in a reverse direction with respect to circuit operating potential. A second diode bank, shown generally at 63, includes a pair of diodes CR5 and CR6 in series connection between a junction 78 of the heating element 74 and the first diode bank 61, and the operating potential at junction 30, with said diodes being poled so as to be reverse biased by said operating potential. A diode CR7 is connected between junction 30 and ground in a reverse direction relative to the circuit operating potential. In close thermal proximity to both the thermostat 70 and the heater element 74 is a heat sink shown schematically at 80. The heat sink may be fabricated from a heat retaining material, such as a silicon compound, and is preferably located on the opposite side of the heater element 74 with respect to the thermostat 70. Again, with reference to the FIG., a spark gap 82 is connected across the input terminals 56 and 58.

In operation of the device, the thermostat 70 is preset so that its snap-action disc will actuate from its closed position to its open position 70' when heated to a sensing temperature of 175° F. and will reset to its closed position at a sensing temperature of 135° F. If, in the normal use of the device, a circuit, such as the circuit 64 having an unknown resistance $R_x$ to be measured is connected to the input terminals 56 and 58, its resistance value will be indicated by observation of the reading of meter 54 effectively connected across said unknown resistance. For example, measurement of the unknown resistance $R_x$ is made by applying the operating potential voltage across the series connection of the unknown resistance and a selected resistor of the resistor bank 14 and reading the voltage drop across the resistance $R_x$ on the meter 54 calibrated in resistance readings. The thermostat 70 will remain in a closed position since the reverse biased diodes CR5 and CR6 will prevent current flow from the operating potential source along conductor 76 through the junction 78 and through the heating element 74. Additionally, the diodes CR3 and CR4 are poled to prevent current flow along the conductor 72 and through the heater element 74. However, when an external voltage source, such as $V_x$ is erroneously connected to the input terminals 56 and 58, a current is produced through the heater element 74 causing the snap-action disc element of the thermostat 70 to actuate to its open position 70', thereby disconnecting the indicating circuit 16 and resistance bank 14 from the input terminal 56. More particularly, if the applied voltage is of negative polarity for example, a current will be caused to flow through the input terminals 58, along the conductor 60, through the diodes CR3 and CR4, through the junction 78 and through the heater element 74. The passage of current through the heater element 74 causes its temperature to elevate, and the heat emitted therefrom will be coupled to the thermostat 70. When the thermostat 70 has been heated to a predetermined temperature of for example, 175° F., the snap-action disc of the thermostat 70 will open to a position 70'. The opening of the thermostat disc to its position 70' electrically disconnects the resistor bank 14 and indicating circuit 16 from its input terminal 56, thereby preventing the passage of damaging current through the circuit 16. If a voltage of a positive polarity is applied, current will flow through the diodes CR5, CR6, CR1 and CR2. The diode CR7 is provided to further isolate the power source 12 upon the connection of a negative voltage source to the terminals 56 and 58. It is noted that a damaging current will momentarily be experienced by the selected resistor in the resistor bank 14, and that a current in a reverse direction will be momentarily coupled to the power source 12. However, the reaction time for the protector circuit shown and described in its preferred embodiment can be fabricated to produce actuation of the thermostat disc to its open position in less than 0.5 seconds, and the power source 12 and the resistance bank 14 can be designed to withstand overload current during the short interval of 0.5 seconds. Additionally, if the voltage source connected to the input terminals 56 and 58 is extremely high, arcing will be produced across the spark gap 82 in order to further isolate the resistance bank 14 and indicating circuit 16 from the presence of the erroneously applied voltage.

Since the heating of the thermostat 70 is done indirectly, i.e. by the heating element 74, and is not due primarily to the passage of current through the thermostat, the thermostat can be chosen to present a substantially zero or negligible resistance to the indicator circuit 16 and the resistor bank 14, regardless of the value of the resistor in the bank 14 selected during a particular operation of the apparatus.

The heat sink 80 is heated simultaneously with the bimetallic snap-action disc of the thermostat and is provided to store heat energy therein and to transfer the stored energy to the bimetallic disc of the thermostat 70, in order to delay its reset to a closed position after removal of the voltage source $V_x$ from the input terminals 56 and 58. More particularly, upon the application of a source of voltage to the input terminals 56 and 58, the temperature attained by the heater element 74 will be higher than the temperature at which the thermostat is caused to open. The heat sink 80 will store the heat energy given off by the heating element 74 and will transfer the heat energy to the thermostat, thereby delaying the cooling thereof to its reset temperature. The greater the erroneously applied voltage, the greater amount of heat will be stored by the heat sink 80. Accordingly, the reset time of the thermostat is extended in direct proportion to the value of an erroneously applied voltage to the input terminals 56 and 58. The disconnected condition of the resistor bank 14 and the indicating circuit 16 will be maintained over a time interval in direct proportion to the value of the erroneously connected voltage.

Although a preferred embodiment of the invention has been shown and described, other embodiments and modifications thereof are within the scope of the appended claims. For example, the protector circuit is not necessarily limited to use in a resistance measuring circuit but can be employed to equal advantage in other types of measuring equipment for the protection of delicate meter movements and sensitive circuits.

I claim:

1. In an electrical measuring system having first and second input terminals adapted for application thereto of a desired range of electrical input conditions to provide at an output of said measuring system an indication of the relative magnitude of any one of said conditions within said desired range, in combination therewith a protector circuit for disabling said measuring system upon application to said input terminals of an electrical condition not within said desired range, said circuit comprising:

thermal sensitive switching means connected to said first input terminal and operative in a first position to provide a low impedance path thereacross permitting said electrical condition to be applied to said terminal, and operative in a second condition to provide an open circuit for preventing said electrical condition from being applied to said terminal;

a heating element positioned with respect to said thermal switching means to apply heat thereto when energized by a suitable circuit, said thermal switching means assuming said second condition when heated by said heating element; and threshold responsive means connected in series with said heating element between said first and second terminals including first diode means connected between said heating element and said second input terminal and poled to provide a conductive path for the passage of said suitable current through said heating element upon the application of an electrical condition of a given polarity not within said given range across said first and second terminals and second diode means connected between said heating element and said second terminal and poled to provide a conductive path for the passage of said suitable current through said heating element upon the application of an electrical condition of an opposite polarity across said first and second terminals, said first and second diode means being normally reverse biased and providing an open circuit for electrical conditions within said desired range.

2. In an electrical measuring apparatus including a visual display means having a common terminal connected to a point of reference potential and an input terminal connected in series circuit path in the sequence named with an adjustable resistance means and source of operating potential of a given polarity, wherein said display means directly indicates the ohmic value of a resistance circuit coupled across said input and common terminals, the combination therewith of a circuit for protecting said apparatus against damage due to coupling of an external voltage across said terminals, said circuit comprising:

first and second input terminals adapted to have the resistance circuit to be measured connected thereacross, said second terminal being connected to said reference potential point;

temperature sensitive switch means normally closed to provide a direct current circuit connection between said first terminal and said display means input terminal and opening said normally closed connection in response to being heated to a predetermined temperature;

a third terminal;

a heater element located in cooperative relationship with said switch means and connected between said display means input terminal and said third terminal;

means including a first diode connected between said third terminal and said source of operating potential and poled to provide a conductive path in series circuit with said heater element for the passage of current therethrough upon the application of an external voltage of said given polarity across said first and second terminals; and means including a second diode connected between said third terminal and said point of reference potential and poled to provide a conductive path in series circuit with said heater element for the passage of current therethrough upon the application of an external voltage of an opposite polarity across said first and second terminals;

said heater element in response to current flow therethrough providing a heat transfer to said switch means sufficient to actuate said switch means to open circuit the connection between said first terminal and said display means input terminal.

3. The combination as defined in claim 2 wherein said switch means includes a heat responsive thermostat normally closed and opening in response to being heated to said predetermined temperature and maintaining said open condition until the temperature sensed by said thermostat has decreased to a second predetermined value, whereupon said thermostat will revert to its normally closed position.

4. The combination as defined in claim 3 and further including a heat sink disposed closely adjacent to said thermostat and heater element for storing heat energy emanated from said heater element and thereafter coupling said stored energy to said thermostat so as to delay the cooling in temperature thereof to the second predetermined value, thereby to extend the time duration of the open circuit condition of said thermostat.

5. In an electrical measuring apparatus including a direct current voltage source, resistance means connected in series with said voltage source, means including at least one first forward biased diode connected to ground potential and to a junction of said voltage source and said resistance means, an indicating circuit connected in series with said resistance means, a first input terminal connected in direct current series path to the junction of said resistance means and said indicating circuit, a second input terminal associated with said first input terminal and connected to ground potential, the improvement comprising:

a circuit-disconnecting thermostat connected in said series path between said first input terminal and said junction of said resistance means and said indicating circuit;

a heater resistor and at least one second diode series connected between said second input terminal and said junction of said resistance means and said indicating circuit; and means including a third diode connected to a junction of the heater resistor and said second diode and to a junction of said first diode and said resistance means;

said second and third diodes being poled to prevent current from flowing from said voltage source through said heater resistor;

said heater resistor and said second diode providing a flow path for current produced upon the erroneous connection of a source of negative voltage to said first and second input terminals;

said heater resistor and said third diode providing a flow path for current upon the erroneous connection of a source of positive voltage to said input terminals;

said heater resistor elevating in temperature upon the passage of current therethrough and said thermostat disconnecting said resistance means and indicating circuit from said first input terminal upon sensing the elevated temperature of said heater resistor.

6. The structure as recited in claim 5, wherein said thermostat is automatically resettable to a closed position and further including a heat sink thermally coupled to said thermostat and said heater resistor for storing heat energy emanated from said heater resistor and for extending the reset time of said thermostat.

7. The structure as recited in claim 6, and further including high voltage sensing means connected between said first and second input terminals and operative to provide a low impedance path across said input terminals upon connection of a voltage source thereto which has a magnitude that exceeds a given, predetermined value.

8. The structure according to claim 7, wherein said high voltage sensing means comprises a spark gap selected to sustain an arc thereacross for voltages above said given, predetermined value.